United States Patent
Fan et al.

(10) Patent No.: US 11,424,810 B2
(45) Date of Patent: *Aug. 23, 2022

(54) METHOD AND DEVICE FOR RANDOM ACCESS FOR BEAM FAILURE RECOVERY

(71) Applicant: Telefonaktiebolaget LM Ericsson (publ), Stockholm (SE)

(72) Inventors: Rui Fan, Beijing (CN); Icaro L. J. Da Silva, Solna (SE); Helka-Liina Määttanen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/085,329

(22) Filed: Oct. 30, 2020

(65) Prior Publication Data

US 2021/0050903 A1   Feb. 18, 2021

Related U.S. Application Data

(63) Continuation of application No. 16/089,351, filed as application No. PCT/CN2018/101051 on Aug. 17, 2018, now Pat. No. 10,826,592.

(51) Int. Cl.
*H04B 7/02* (2018.01)
*H04B 7/06* (2006.01)
*H04W 74/00* (2009.01)
*H04W 74/02* (2009.01)
*H04W 74/08* (2009.01)

(52) U.S. Cl.
CPC ......... *H04B 7/0695* (2013.01); *H04B 7/0617* (2013.01); *H04W 74/006* (2013.01); *H04W 74/02* (2013.01); *H04W 74/0833* (2013.01)

(58) Field of Classification Search
CPC . H04B 7/0695; H04B 7/0617; H04W 74/006; H04W 74/0833; H04W 74/02
See application file for complete search history.

(56) References Cited

U.S. PATENT DOCUMENTS

| | | | |
|---|---|---|---|
| 10,826,592 B2 * | 11/2020 | Fan | H04W 74/02 |
| 2014/0233530 A1 * | 8/2014 | Damnjanovic | H04W 74/006 370/331 |
| 2015/0319800 A1 | 11/2015 | Park et al. | |

(Continued)

FOREIGN PATENT DOCUMENTS

| CN | 102217362 A | 10/2011 |
|---|---|---|
| CN | 103607233 A | 2/2014 |

(Continued)

OTHER PUBLICATIONS

3GPP TSG-RAN WG2 Meeting #NR AH2 R2-1706396, Qingdao, China, Jun. 27-29, 2017, Source: CATT Title: Beam management (Year: 2017).*

(Continued)

*Primary Examiner* — Dhaval V Patel
(74) *Attorney, Agent, or Firm* — Nicholson De Vos Webster & Elliott LLP

(57) ABSTRACT

A method for random access for beam failure recovery. In the method, a random access configuration for the beam failure recovery is received. In the event of a beam failure, a random access procedure is performed according to the random access configuration.

9 Claims, 5 Drawing Sheets

(56) References Cited

U.S. PATENT DOCUMENTS

| | | | |
|---|---|---|---|
| 2015/0351135 A1 | 12/2015 | Schmidt et al. | |
| 2016/0192401 A1* | 6/2016 | Park | H04W 72/046 370/329 |
| 2017/0181134 A1* | 6/2017 | Niu | H04B 17/318 |
| 2018/0035470 A1* | 2/2018 | Chen | H04W 48/16 |
| 2018/0084585 A1 | 3/2018 | Lee et al. | |
| 2018/0139668 A1 | 5/2018 | Takahashi et al. | |
| 2018/0375556 A1* | 12/2018 | Wang | H04B 7/2041 |
| 2019/0053293 A1* | 2/2019 | Akoum | H04W 24/10 |

FOREIGN PATENT DOCUMENTS

| | | |
|---|---|---|
| KR | 10-2016-0146887 A | 12/2016 |
| KR | 10-2017-0089962 A | 8/2017 |
| RU | 2603969 C2 | 12/2016 |
| WO | 2017/024516 A1 | 2/2017 |

OTHER PUBLICATIONS

Final Office Action, U.S. Appl. No. 16/089,351, dated Jan. 17, 2020, 22 pages.

International Preliminary Report on Patentability (Chapter II), PCT App. No. PCT/CN2018/101051, dated Dec. 20, 2019, 7 pages.

International Search Report and Written Opinion for Application No. PCT/CN2018/101051, dated Nov. 27, 2018, 9 pages.

Lenovo, et al., "Random Access Procedure for Beam Recovery Request," 3GPP TSG-RAN WG2 Meeting#AH, R2-1707001, Jun. 27-29, 2017, pp. 1-4.

Non-Final Office Action, U.S. Appl. No. 16/089,351, dated Jul. 22, 2019, 22 pages.

Notice of Allowability, U.S. Appl. No. 16/089,351, dated Sep. 21, 2020, 3 pages.

Notice of Allowance, U.S. Appl. No. 16/089,351, dated Jul. 6, 2020, 8 pages.

Office Action, RU App. No. 2020107143, dated Jul. 31, 2020, 7 pages (2 pages of English Translation and 5 pages of Original Document).

Samsung, "Relationship of NR Beam Recovery and RLF Procedures," 3GPP TSG-RAN WG2 2017 RAN2 Ad-hoc Meeting, R2-1707304, Jun. 27-29, 2017, 5 pages.

3GPP TS 36.321 V14.3.0, "3rd Generation Partnership Project; Technical Specification Group Radio Access Network; Evolved Universal Terrestrial Radio Access (E-UTRA); Medium Access Control (MAC) protocol specification (Release 14)," Jun. 2017, 107 pages.

3GPP TS 36.331 V14.3.0, "3rd Generation Partnership Project; Technical Specification Group Radio Access Network; Evolved Universal Terrestrial Radio Access (E-UTRA); Radio Resource Control (RRC); Protocol specification (Release 14)," Jun. 2017, 745 pages.

Notification of Reason for Refusal, KR App. No 10-2020-7004701, dated Dec. 16, 2020, 12 pages (6 pages of English Translation and 6 pages of Original Document).

3GPP TSG RAN WG1 Meeting #88, R1-1701716, Huawei et al., "Discussion on link recovery procedure for beam blockage," Feb. 13-17, 2017, 4 pages, Athens, Greece.

3GPP TSG-RAN WG1 #89ah-NR, R1-1711017, Ericsson, "Mechanism to recover from beam failure," Jun. 27-30, 2017, 8 pages, Qingdao, China.

3GPP TSG RAN WG1 Meeting #89, R1-1707782, Spreadtrum Communications, "Discussion on UE initiated recovery from beam failure," May 15-19, 2017, 6 pages, Hangzhou, P.R. China.

3GPP TSG-RAN WG2 Meeting #NR Adhoc 2, R2-1707086, ASUSTeK, "Discussion on multiple random access parameters in NR," Jun. 27-29, 2017, 4 pages, Qingdao, China.

3GPP TSG RAN WG1 NR Ad-Hoc#2, R1-1710596, Lenovo et al., "Discussion of beam recovery procedure," Jun. 27-30, 2017, 6 pages, Qingdao, P.R. China.

3GPP TSG-RAN WG1 NR#2, R1-1711161, Qualcomm Incorporated, "Beam recovery procedures," Jun. 27-30, 2017, 6 pages, Qingdao, P.R. China.

3GPP TSG-RAN WG2 Meeting #NR AH2, R2-1706396, CATT, "Beam management," Jun. 27-29, 2017, 6 pages, Qingdao, China.

3GPP TSG RAN WG1 NR Ad-Hoc#2, R1-1711291, Nokia et al., "Beam Recovery," Jun. 27-30, 2017, 8 pages, Qingdao, P.R. China.

Examination Report, IN App. No. 202047006200, dated Feb. 26, 2021, 6 pages.

Extended European Search Report, EP App. No. 18846478.8, dated Apr. 22, 2021, 15 pages.

First Office Action, CN App. No. 201880052509.7, dated Mar. 26, 2021, 8 pages (2 pages of English Translation and 6 pages of Original Document).

Samsung, "Beam failure recovery", 3GPP TSG RAN WG1 Meeting #90, R1-1713597, Aug. 21-25, 2017, 6 pages.

ZTE, "Discussion on beam recovery mechanism", 3GPP TSG RAN WG1 Meeting #89, R1-1707121, May 15-19, 2017, 8 pages.

Examination Report No. 1, AU App. No. 2018317591, dated Aug. 17, 2020, 5 pages.

Grant of Patent, KR App. No. 10-2020-7004701, dated Jun. 22, 2021, 4 pages(2 pages of English Translation and 2 pages of Original Document).

Notice of Acceptance for Patent Application, AU App. No. 2018317591, dated Aug. 16, 2021, 3 pages.

Notice of Reasons for Refusal, JP App. No. 2020-508612, dated Dec. 2, 2021, 6 pages (3 pages of English Translation and 3 pages of Original Document).

Notice of Reasons for Refusal, JP App. No. 2020-508612, dated Jul. 21, 2021, 6 pages (3 pages of English Translation and 3 pages of Original Document).

Second Office Action, CN App. No. 201880052509.7, dated Dec. 8, 2021, 14 pages (6 pages of English Translation and 8 pages of Original Document).

ZTE, "Discussion on mechanism to recovery from beam failure", 3GPP TSGRAN WG1 Meeting #90, R1-1712300, Aug. 21-25, 2017, 9 pages.

Office Action, CN App. No. 201880052509.7, dated Jun. 1, 2022, 5 pages of Original Document Only.

\* cited by examiner

METHOD AND DEVICE FOR RANDOM ACCESS FOR BEAM FAILURE RECOVERY

CROSS-REFERENCE TO RELATED APPLICATIONS

This application is a continuation of U.S. application Ser. No. 16/089,351, filed Sep. 27, 2018, which is a National stage of International Application No. PCT/CN2018/101051, filed Aug. 17, 2018, which claims priority to International Application No. PCT/CN2017/098093, filed Aug. 18, 2017, which are all hereby incorporated by reference.

TECHNICAL FIELD

The present disclosure relates generally to wireless access technology, and in particular, to a method for random access for beam failure recovery and related terminal device and network device.

BACKGROUND ART

In a NR (New Radio) system, in order to improve coverage and increase data rate, beamforming is widely used. With the beamforming, a network device may transmit user specific data via narrow beam which can improve SINR (Signal to Interference plus Noise Ratio). Since the beam provides quite narrow coverage, it is possible that a user equipment (UE) may be suddenly out of the coverage of the beam. Thus the network device would not be able to efficiently schedule the data to the UE and/or the UE would not monitor the right beam (or beam link pair) used by the network device to transmit a control channel (like PDCCH) and the UE would not be able to detect the scheduled information. This problem is typically called "beam failure".

SUMMARY OF THE INVENTION

It is therefore an object of embodiments of the present disclosure to provide a method for random access for beam failure recovery, which can implement beam failure recovery using random access.

According to a first aspect of the disclosure, there is provided a method in a user equipment for random access for beam failure recovery. In the method, specific random access configuration for the beam failure recovery is received from a base station. In the event of a beam failure, a random access procedure is performed according to the specific random access configuration.

In some embodiments, at least one candidate beam with downlink quality higher than a first threshold is detected, and the random access is performed via the respective at least one candidate beam.

In some embodiments, a candidate beam which has the highest downlink quality of the at least one candidate beam is determined, and the random access is performed via the determined candidate beam. If the random access fails, another candidate beam of the at least one candidate beam is determined, and the random access is performed via the another candidate beam.

In some embodiments, it is determined whether the determined candidate beam is configured with a contention free random access resource or a contention based random access resource. If it is determined that the determined candidate beam is configured with the contention free random access resource, contention free random access is performed via the determined candidate beam. If it is determined that the determined candidate beam is configured with the contention based random access resource, it is determined whether the downlink quality of the determined candidate beam is higher than that of any candidate beam configured with a contention free random access resource by a second threshold. If it is determined that the downlink quality of the determined candidate beam is higher than that of any candidate beam configured with the contention free random access resource by the second threshold, contention based random access is performed via the determined candidate beam. If it is determined that the downlink quality of the determined candidate beam is not higher than that of any candidate beam configured with the contention free random access resource by the second threshold, contention free random access is performed via the candidate beam configured with the contention free random access resource.

In some embodiments, if the random access procedure is stopped, an indication is generated that the random access procedure is for the beam failure recovery.

In some embodiments, the random access procedure is stopped when a maximum number of preamble transmission attempts is reached or a radio link failure timer expires.

In some embodiments, the specific random access configuration comprises at least one of the following parameters: a maximum number of preamble transmission attempts, a size of random access response window, and a contention free random access resource.

In some embodiments, the contention free random access resource is set as a plurality of different random access resources reserved for the beam failure recovery and/or one random access resource reserved for the beam failure recovery with multiple attempts to use.

In some embodiments, the random access is performed before the plurality of different random access resources is released or the multiple attempts are reached.

According to a second aspect of the disclosure, there is provided a user equipment. The user equipment comprises a processor and a memory, said memory containing instructions executable by said processor, whereby said user equipment is operative to receive specific random access configuration for the beam failure recovery and to perform, in the event of a beam failure, a random access procedure according to the specific random access configuration.

According to a third aspect of the disclosure, there is provided a method in a base station for random access for beam failure recovery. In the method, specific random access configuration is set for the beam failure recovery. Then the specific random access configuration is transmitted to a user equipment.

According to a fourth aspect of the disclosure, there is provided a base station. The base station comprises a processor and a memory, said memory containing instructions executable by said processor, whereby said base station is operative to set specific random access configuration for the beam failure recovery, and to transmit the specific random access configuration.

According to a fifth aspect of the disclosure, there is provided a computer readable storage medium having a computer program stored thereon. The computer program is executable by a device to cause the device to carry out the method for random access for beam failure recovery according to the first aspect of the disclosure.

According to a sixth aspect of the disclosure, there is provided a computer program product executable by a device to cause the device to carry out the method for random access for beam failure recovery according to the third aspect of the disclosure.

According to a seventh aspect of the disclosure, there is provide a device for random access for beam failure recovery. The device comprises a receiver configured to receive specific random access configuration for the beam failure recovery, and a performing module configured to perform, in the event of a beam failure, a random access procedure according to the specific random access configuration.

According to an eighth aspect of the disclosure, there is provide a device for random access for beam failure recovery. The device comprises a setting module configured to set specific random access configuration for the beam failure recovery, and a transmitter configured to transmit the specific random access configuration.

It is an advantage that the method for random access according to the embodiments can utilize the specific random access configuration to implement the beam failure recovery through the random access procedure. Moreover, the random access procedure based on the specific random access configuration can increase the success of the beam failure recovery and reduce the delay of the beam failure recovery. In addition, the method can minimize negative impact on performance of the terminal device due to failure of the beam recovery.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure. The drawings are illustrated for facilitating better understanding of the embodiments of the disclosure and not necessarily drawn to scale, in which.

DETAILED DESCRIPTION

Figure 1:
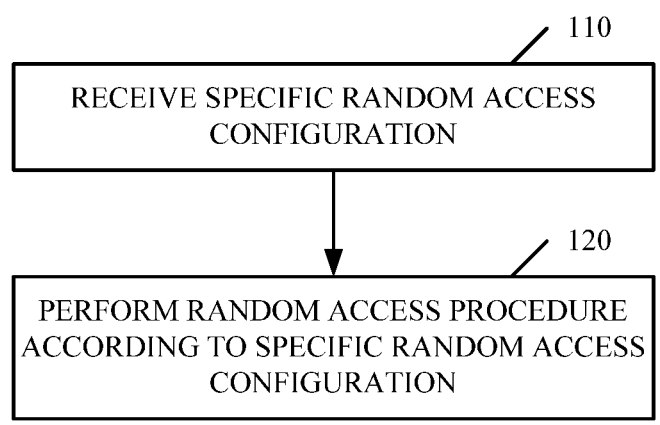
FIG. 1 is a flowchart illustrating the method for random access for beam failure recovery according to some embodiments of the present disclosure.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

3GPP has acknowledged the importance of the beam failure problem and started to discuss for 5G system a procedure called "beam recovery" upon detection of a beam failure for UEs in RRC_CONNECTED state. In the beam recovery, the UE in RRC_CONNECTED state would perform measurements associated to the quality of the serving link and, if the quality goes below a given threshold, the UE would perform beam recovery. The procedure aims to solve the situation where TX and/or RX beams of the network device such as gNodeB and the UE have become misaligned, but there are additional beams that could be used to maintain the connection between the gNodeB and the UE.

The beam failure recovery procedure may include the following aspects:

Beam failure detection: the UE may monitor a certain periodic reference signal (RS) to estimate the quality of the serving link. Once the quality of the serving link falls below a certain threshold, which means a beam failure occurs, the UE may initiate the beam recovery.

New candidate beam identification: Once the beam failure has been detected, the UE may identify a new candidate beam that would provide adequate quality. The UE then searches for a specific RS, which is transmitted from the same network device but in different candidate beams. During this search procedure, the UE may also change its RX beam.

Beam failure recovery request: Once the new candidate beam has been found, the UE may transmit an uplink (UL) signal using certain UL resources. The gNodeB may receive the UL signal in these UL resources, and can determine which candidate beam the UE identified based on the received UL signal.

Beam failure recovery response: When the gNodeB has received the beam failure recovery request, it sends a downlink (DL) response to indicate to the UE that it received the request using the knowledge of the new beam. The UE may monitor the response to the beam failure recovery request. Once the UE has successfully received the response, the beam recovery is complete.

Currently, it is proposed that a random access procedure may be used for the beam failure recovery. It is known that the random access procedure is not designed as a recovery procedure but as an ordinary procedure to be triggered during an initial access to a wireless network of the UE, e.g. when the UE is turned on, or during a transition from RRC_IDLE state and/or RRC_INACTIVE state to RRC_CONNECTED state of the UE, and during a handover execution. Considering the ordinary random access procedure also requires a beam selection mechanism, as required in the beam failure recovery, therefore the random access procedure may also be used for beam failure recovery. The beam is recovered when the random access procedure is successful. Additionally, both a content free random access procedure and a contention based random access procedure may be used to recover the beam.

However, due to the different purposes of the random access procedure, there may be some problems if the UE has to perform the beam failure recovery according to the same random access configuration and procedure as the ordinary random access procedure. Now there are quite a lot details about the random access for the beam failure recovery not settled.

In view of the above, embodiments of the present disclosure provide a new random access mechanism specific for beam failure recovery.

FIG. 1 shows a flowchart illustrating the method for random access for beam failure recovery according to some embodiments of the disclosure. This method may be performed by a terminal device in a wireless communication network with beamforming. The wireless communication network may be, for example, a LTE (Long Term Evolution) system, or a NR system, etc. The terminal device may be a user equipment, such as a mobile phone, a smart phone, a wearable device, a tablet, and the like.

As shown in FIG. 1, at block 110, the terminal device may receive specific random access configuration for the beam failure recovery. The specific random access configuration may comprise same parameters as those in the random access configuration for the ordinary random access procedure, but in the specific random access configuration, some of the parameters are reconfigured to be different from the ordinary random access procedure, which will be described later. Moreover, the specific random access configuration may be received from a network device (e.g. a base station in the NR system, e.g. gNodeB) via dedicated signaling.

To facilitate understanding, the random access configuration will be first briefly introduced. The random access configuration may include at least the following:

1) RACH-ConfigCommon
Preamble information
  Number of preambles (numberOfRA-Preambles): Number of non-dedicated random access preambles as defined in the MAC specifications TS 36.321 encoded as an integer value. In LTE, there can be a maximum number of 64 preambles, while in NR a higher number may be expected. Less preambles for common random access channel (RACH) may increase the number of preambles to be assigned for dedicated access and/or can potentially reduce the detection complexity at the network side (as fewer preambles need to be detected).
Preamble group configurations: It consists of size of preambles, message size and message power offsets.
Power ramping parameters (PowerRampingParameters): In LTE, it consists of a powerRampingStep and a preambleInitialReceivedTargetPower. In NR, similar parameters are expected. In addition, there could also exist something related to the number of attempts before the UE switches to another Tx or Rx beam.
Random access supervision parameters
  Maximum number of preamble transmission attempts (preambleTransMax): In LTE, the preambleTransMax is the number of timers the UE should try to send a preamble without necessary decoding a random access response (RAR) successfully.
  Size of RAR window (ra-ResponseWindowSize): In LTE, the ra-ResponseWindowSize is defined as the duration of the RA response window in TS 36.321 where the value is provided in subframes.
  Timer for contention resolution (mac-ContentionResolutionTimer).
Maximum number of HARQ for MSG.3 (maxHARQ-Msg3Tx): In LTE, the parameters maxHARQ-Msg3Tx defines the Msg3 HARQ transmissions in TS 36.321 used for contention based random access.
Additional parameters that may exist in NR: As a DL beam transmitted by the network device and detected by the UE by detection of a synchronization signal (SS) block and a SS block identifier, there could also be CSI-RS (Channel State Information Reference Signal) to RACH mapping.

2) RACH-ConfigDedicated
Preamble index
PRACH Mask Index

In some embodiments, the specific random access configuration may comprise contention based random access configuration (e.g. RACH-ConfigCommon) and the contention free random access configuration (e.g. RACH-ConfigDedicated). In the specific random access configuration, the following parameters may be configured to be specific to the beam failure recovery and different from the ordinary random access procedure:

Maximum number of preamble transmission attempts: For the random access procedure for the beam failure recovery, there could be a radio link failure (RLF) timer running. When the RLF timer expires, the terminal device should do cell reselection to find a suitable cell, instead of recovering the beam in the original cell. Therefore, the maximum number of preamble transmission attempts for the beam failure recovery should take the RLF timer into account and may be set different from the ordinary random access procedure. Moreover, the random access procedure for the beam failure recovery will be stopped if the maximum number of preamble transmission attempts is reached or the RLF timer expires. For example, if the RLF timer expires, the terminal device cannot continue the random access for the beam failure recovery, even if the maximum number of preamble transmission attempts has not been reached. If the maximum number of preamble transmission attempts is reached but the RLF timer does not expire, the random access procedure for the beam failure recovery will also be stopped.

Size of RAR window: As described above, the size of RAR window is the duration of receiving the RAR from the network device. In order to speed up the beam failure recovery, the size of RAR window may be set different from the ordinary random access procedure. For example, the size of RAR window may be set shorter. When the network device identifies a preamble signal from the terminal device that is used for the beam failure recovery, the network device may send a response more quickly than the ordinary random access procedure.

Resource for contention free random access (also referred to as "contention free random access resource"): In the ordinary random access procedure, the reserved contention free random access resource cannot be reused if the contention free random access fails. But in the beam failure recovery, there may be multiple candidate beams suitable for the beam failure recovery. Therefore, it is expected that the contention free random access can be continued via a different candidate beam when the previous random access fails. Thus in the specific random access configuration, the contention free random access resource may be set as a plurality of different random access resources reserved for the beam failure recovery and/or one random access resource reserved for the beam failure recovery with multiple attempts to use. The terminal device may perform the contention free random access multiple times using the different random access resources reserved for the beam failure recovery or the same random access resource reserved for the beam failure recovery.

Figure 2:
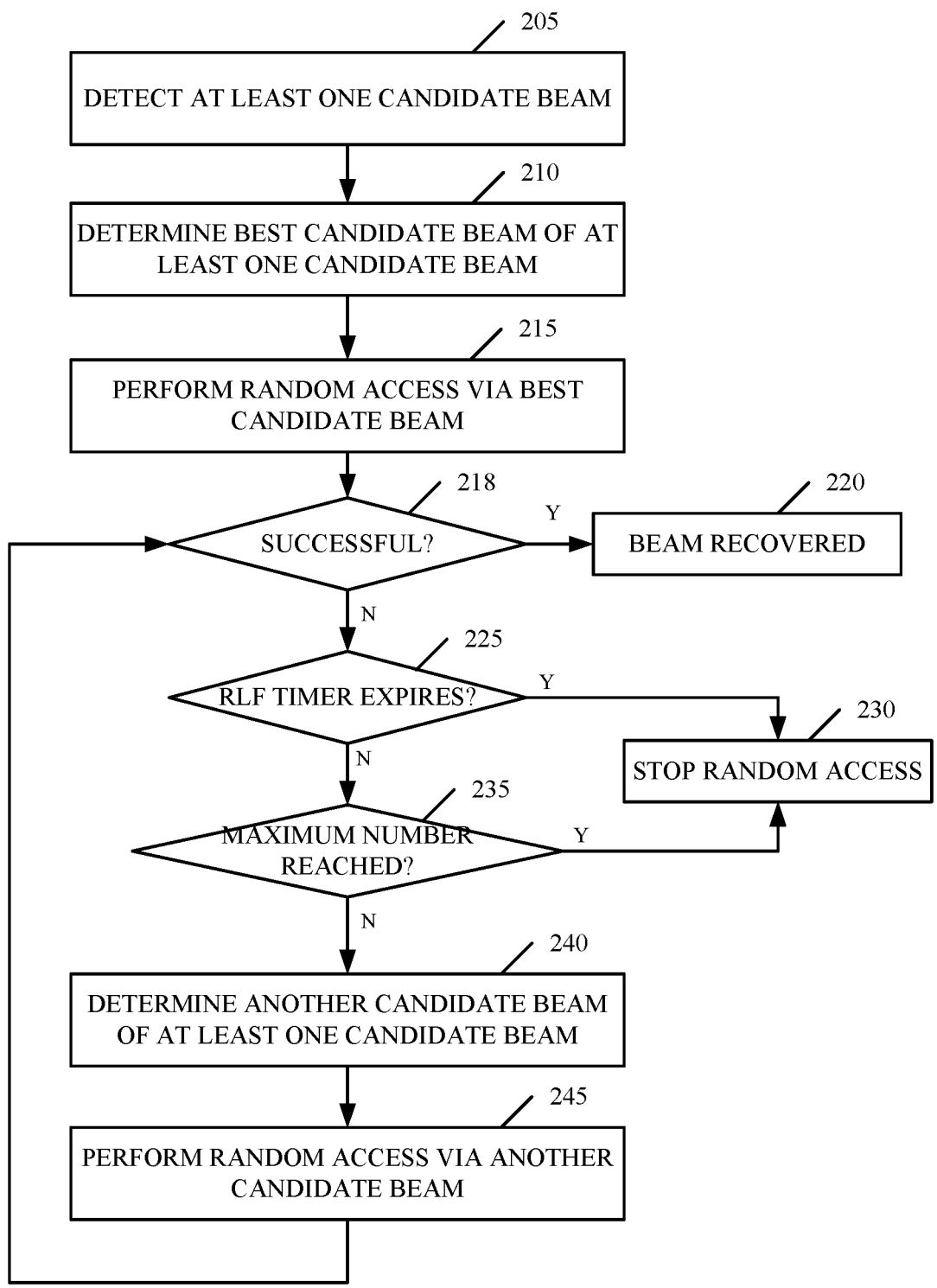
FIG. 2 is a flowchart illustrating an exemplary process of random access according to some embodiments of the present disclosure.

Then at block 120, in the event of a beam failure, the terminal device may perform a random access procedure according to the received specific random access configuration. FIG. 2 illustrates an exemplary process of random access according to some embodiment of the present disclosures.

As shown in FIG. 2, at block 205, when a beam failure occurs, e.g. the terminal device moves out of its serving beam, the terminal device may detect at least one candidate beam that is suitable for the beam failure recovery. The candidate beam has a downlink quality higher than a given threshold (i.e. first threshold). The downlink quality may be represented by a Reference Signal Received Power (RSRP).

Then the terminal device may perform the random access via the respective at least one candidate beam. In some embodiments, at block 210, the terminal device may determine a candidate beam with the highest downlink quality of the detected at least one candidate beam, which can be referred to as "a best candidate beam". Then at block 215, the terminal device may perform random access via the best candidate beam. If the random access is successful (i.e. "Y" of block 218), at block 220, the best candidate beam becomes the new serving beam of the terminal device, and the terminal device may communicate with the network device via the new serving beam. If the random access fails (i.e. "N" of block 218), the terminal device may check whether the RLF timer expires at block 225. If the RLF timer expires, the random access procedure for beam failure recovery is stopped at block 230. If the RLF timer does not expire, the terminal device may check whether the maximum number of preamble transmission attempts is reached at block 235. If the maximum number of preamble transmission attempts is reached, the random access procedure for beam failure recovery is stopped at block 230. If the maximum number of preamble transmission attempts is not reached, at block 240, the terminal device may determine another candidate beam (if any) of the detected at least one candidate beam. This candidate beam may have the second highest downlink quality. Then at block 245, the terminal device may perform the random access via this candidate beam. If the random access fails, the terminal may repeatedly perform blocks 218 to 245 until the random access is successful or the maximum number of preamble transmission attempts is reached or the RLF timer expires.

In some embodiments, the candidate beam may be used for the random access for the beam failure recovery more than once. For example, there are two candidate beams and the maximum number of preamble transmission attempts is four. Then if the random accesses via the two candidate beams both fail, but the maximum number of preamble transmission attempts is not reached. The two candidate beams may be used again for the random access if the downlink quality is still above the first threshold. For the contention free random access, different reserved random access resources or the same reserved random access resource (if the number of attempts is not reached) may be utilized.

In some embodiments, the terminal device may detect the candidate beam(s) continuously. In this way, the terminal device may select the current best candidate beam every time when performing the random access.

In some embodiments, when the random access procedure for the beam failure recovery is stopped, the terminal device may generate an indication to a higher layer that the random access procedure is for the beam failure recovery. In the ordinary random access procedure, when the maximum number of preamble transmission attempts is reached, MAC layer of the terminal device may send an indication of the random access failure to RRC layer of the terminal device which then declares the radio link failure. Then a RRC connection reestablishment procedure may be triggered. For the random access procedure for the beam failure recovery, there is the RLF timer to trigger the radio link failure. When the RLF timer expires, the RRC connection reestablishment procedure will be triggered. Therefore, it is not necessary for the RRC layer to declare the radio link failure. When the RRC layer receives the indication from the MAC layer which indicates that the random access procedure is for the beam failure recovery, RRC layer does nothing.

Figure 3:
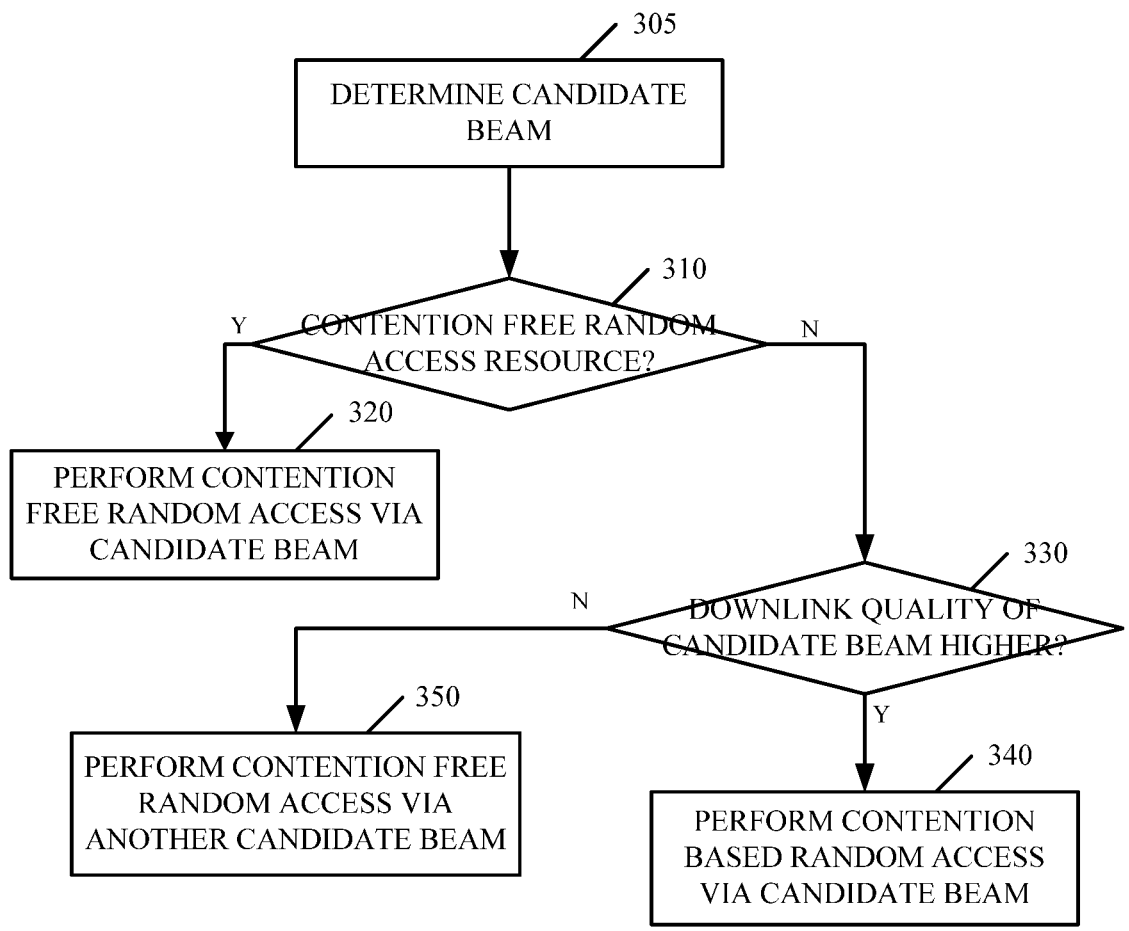
FIG. 3 is a diagram illustrating another exemplary process of random access according to some embodiments of the present disclosure.

In some cases, in the wireless system, some beams are configured with the contention free random access resources, and some beams are configured with the contention based random access resources. FIG. 3 shows another exemplary process of the random access implementable in such the wireless system.

In FIG. 3, when the terminal device determines a candidate beam for the beam failure recovery (at block 305), at block 310, the terminal device may determine whether the determined candidate beam is configured with the contention free random access resource or the contention based random access resource. As described above, the terminal device has already received the specific random access configuration which comprises the configuration of the contention free random access resource. The terminal device may make this determination based on the specific random access configuration. Then at block 320, in response to the determination that the candidate beam is configured with the contention free random access resource, the terminal device may perform the contention free random access via the determined candidate beam. If the candidate beam is configured with the contention based random access resource, at block 330, the terminal device may determine whether the downlink quality of the determined candidate beam is higher than that of any candidate beam configured with the contention free random access resource by a second threshold, e.g. N dB. If the determined candidate beam has N dB higher downlink quality than any candidate beam with the contention free random access resource, the terminal device may perform the contention based random access via the determined candidate beam, at block 340. If the downlink quality of the determined candidate beam is not higher than any candidate beam with the contention free random access resource by N dB, the terminal device may select another candidate beam with the contention free random access resource, e.g. the best candidate beam with the highest downlink quality of the candidate beams with the contention free random access resource, and perform the contention free random access via the selected candidate beam, at block 350.

If the random access is successful, the determined candidate beam becomes the serving beam of the terminal device via which the terminal device may communicate with the network device. If the random access fails, the terminal device may continue the random access until the random access procedure is successful or stopped.

It can be seen from the above description that the method for random access for beam failure recovery according to the above embodiments can implement the beam failure recovery through the random access procedure according to the specific random access configuration. With the specific random access configuration, the success of the beam failure recovery can be increased and the delay of the beam failure recovery can be reduced. In addition, the negative impact on the performance of the terminal device due to the failure of the beam recovery can be minimized.

Figure 4:
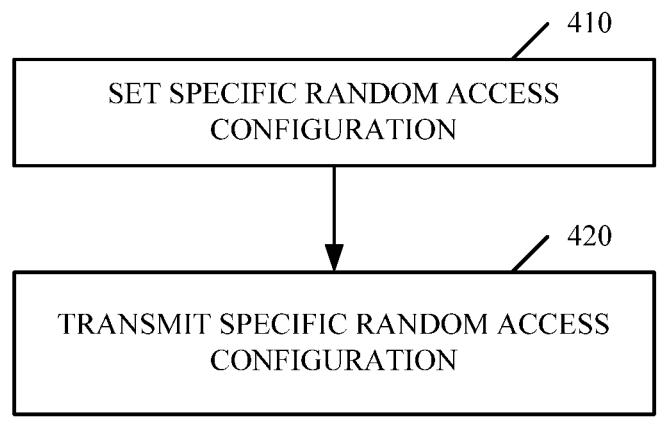
FIG. 4 is a flowchart illustrating the method for random access for beam failure recovery according to some embodiments of the present disclosure.

FIG. 4 is a flowchart illustrating the method for random access for beam failure recovery according to some embodiments of the present disclosure. The method may be performed by a network device. The network device may be a base station in the wireless system, e.g. eNodeB in the LTE system, or gNodeB in the NR system.

As shown in FIG. 4, at block 410, the network device may set specific random access configuration for the beam failure recovery. In some embodiments, the network device may set the maximum number of preamble transmission attempts, the size of random access response window, and the contention free random access resource specific to the beam failure recovery in the specific random access configuration. The contention free random access resource may be set as a plurality of different random access resources reserved for the beam failure recovery and/or one random access resource reserved for the beam failure recovery with multiple attempts to use.

Then at block 420, the network device may transmit the specific random access configuration. The network device may transmit the contention based random access configuration (e.g. RACH-ConfigCommon) and the contention free random access configuration (e.g. RACH-ConfigDedicated) to the terminal device via dedicated signaling.

The method for random access for beam failure recovery according to the embodiments as described above may be applicable in many kinds of applications such as URLLC (Ultra Reliable and Low Latency Communication), MTC (Machine Type of Communication), eMBB (enhanced Mobile Broadband), or mMTC (Massive Machine Type of Communication). The parameters of the specific random access configuration may be configured depending on which kind of application the terminal device operates.

Figure 5:
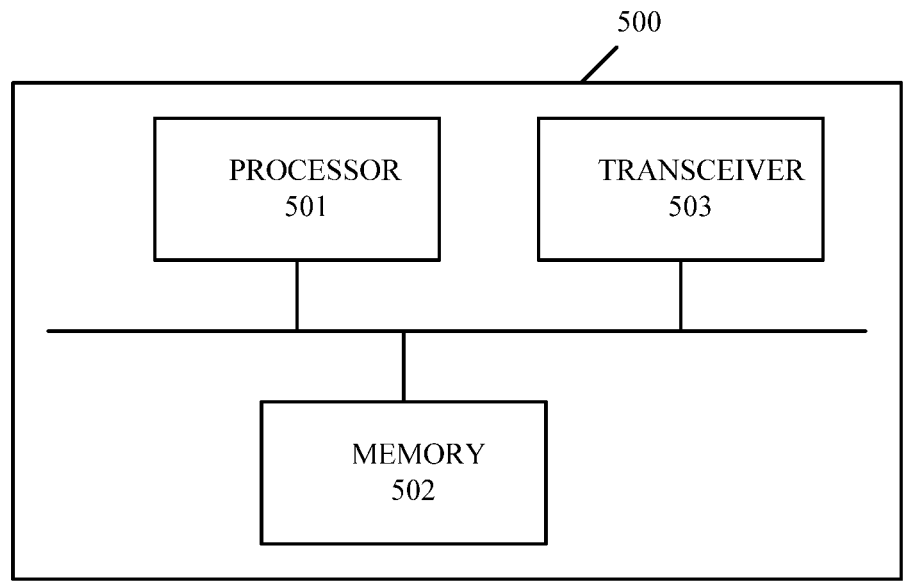
FIG. 5 is a schematic block diagram of the terminal device according to some embodiments of the present disclosure.

FIG. 5 is a schematic block diagram of the terminal device 500 according to some embodiments of the present disclosure. The terminal device 500 may be a user equipment, a mobile phone, a wearable device, a tablet, a vehicle with radio communication functionality, or any other electronic device with radio communication functionality. As shown in FIG. 5, the terminal device 500 may comprise a processor 501 and a memory 502. The memory 502 may contain instructions executable by the processor 501. The terminal device 500 is operative to receive specific random access configuration for the beam failure recovery, and to perform, in the event of a beam failure, a random access procedure according to the specific random access configuration.

The processor 501 may be of any type suitable to the local technical environment, and may comprise one or more of general purpose computers, special purpose computers, microprocessors, digital signal processors (DSPs) and processors based on multi-core processor architectures, as non-limiting examples. The terminal device 500 may have multiple processors, such as an application specific integrated circuit chip that is slaved in time to a clock which synchronizes the main processor.

The memory 502 may be of any type suitable to the local technical environment and may be implemented using any suitable data storage technology, such as semiconductor based memory devices, flash memory, magnetic memory devices and systems, optical memory devices and systems, fixed memory and removable memory, as non-limiting examples. The memory 520 stores at least a part of a program. In addition, the terminal device 500 may further comprise a transceiver 503 operable for bidirectional communications. The transceiver 503 has one or more antenna(s) to facilitate communication. The communication interface may represent any interface that is necessary for communication with other network elements. The program is assumed to include program instructions that, when executed by the associated processor 501, enable the terminal device 500 to operate in accordance with the embodiments of the present disclosure, as discussed herein with reference to FIGS. 1 to 3. That is, embodiments of the present disclosure can be implemented by computer software executable by the processor 501 of the terminal device 500, or by hardware, or by a combination of software and hardware.

In some embodiments, the terminal device 500 is further operative to detect at least one candidate beam with downlink quality higher than a first threshold, and to perform the random access via the respective at least one candidate beam.

In some embodiments, the terminal device 500 is further operative to determine a candidate beam of the at least one candidate beam which has the highest downlink quality, to perform the random access via the determined candidate beam, to determine, if the random access fails, another candidate beam of the at least one candidate beam, and to perform the random access via the another candidate beam.

In some embodiments, the terminal device 500 is operative to determine whether the determined candidate beam is configured with contention free random access resource or contention based random access resource, to perform, if it is determined that the determined candidate beam is configured with contention free random access resource, contention free random access via the determined candidate beam, to determine, if it is determined that the determined candidate beam is configured with contention based random access resource, whether the downlink quality of the determined candidate beam is higher than that of any candidate beam configured with contention free random access resource by a second threshold, to perform, if it is determined that the downlink quality of the determined candidate beam is higher than that of any candidate beam configured with contention free random access resource by the second threshold, contention based random access via the determined candidate beam, and to perform, if it is determined that the downlink quality of the determined candidate beam is not higher than that of any candidate beam configured with contention free random access resource by the second threshold, contention free random access via the candidate beam configured with contention free random access resource.

In some embodiments, the terminal device 500 is further operative to generate, if the random access procedure is stopped, an indication to a higher layer that the random access procedure is for the beam failure recovery.

In some embodiments, the terminal device 500 is operative to stop the random access procedure when a maximum number of preamble transmission attempts is reached or a radio link failure timer expires.

Figure 6:
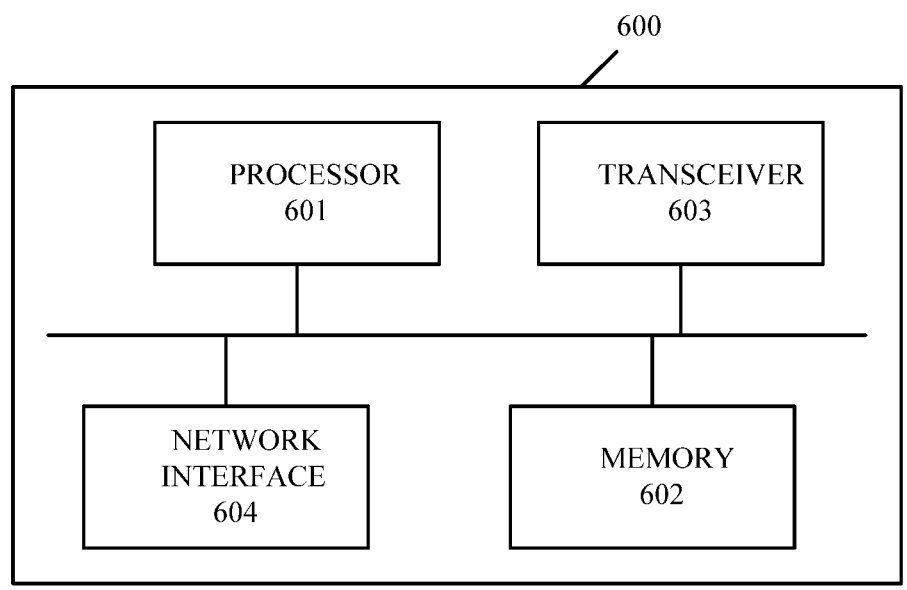
FIG. 6 is a schematic block diagram of the network device according to some embodiments of the present disclosure.

FIG. 6 is a schematic block diagram of the network device 600 according to some embodiments of the present disclosure. The network device may be a base station in the wireless system, e.g. eNodeB in the LTE system, or gNodeB in the NR system. As shown in FIG. 6, the network device 600 may comprise a processor 601 and a memory 602. The memory 602 may contain instructions executable by the processor 601. The network device 600 is operative to set specific random access configuration for the beam failure recovery and to transmit the specific random access configuration.

The processor 601 may be of any type suitable to the local technical environment, and may comprise one or more of general purpose computers, special purpose computers, microprocessors, digital signal processors (DSPs) and processors based on multi-core processor architectures, as non-limiting examples. The network device 600 may have multiple processors, such as an application specific integrated circuit chip that is slaved in time to a clock which synchronizes the main processor. The memory 602 may be of any type suitable to the local technical environment and may be implemented using any suitable data storage technology, such as semiconductor based memory devices, flash memory, magnetic memory devices and systems, optical memory devices and systems, fixed memory and removable memory, as non-limiting examples. The memory 620 stores at least a part of a program. In some embodiments, the network device 600 may further comprise a transceiver 603 operative to transmit signals to and receive signals from the terminal device, and a network interface 604 operative to communicate signals with backend network elements. The transceiver 603 is for bidirectional communications. The transceiver 603 has one or more antenna(s) to facilitate communication. The communication interface may represent any interface that is necessary for communication with other network elements. The program is assumed to include program instructions that, when executed by the associated processor 601, enable the network device 600 to operate in accordance with the embodiments of the present disclosure, as discussed herein with reference to FIG. 3. That is, embodiments of the present disclosure can be implemented by computer software executable by the processor 601 of the terminal device 600, or by hardware, or by a combination of software and hardware.

In some embodiments, the network device 600 is operative to set the specific random access configuration including at least one of the following parameters: a maximum number of preamble transmission attempts, a size of random access response window, and a contention free random access resource.

Figure 7:
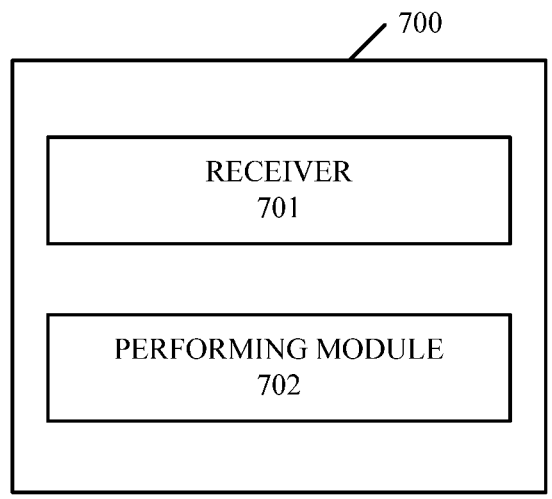
FIG. 7 is a schematic block diagram of a device for random access for beam failure recovery according to some embodiments of the present disclosure.

FIG. 7 is a schematic block diagram of a device 700 for random access for beam failure recovery according to some embodiments of the present disclosure. The device 700 may be a terminal device such as a user equipment. As shown in FIG. 7, the device 700 may comprise a receiver 701 configured to receive specific random access configuration for the beam failure recovery, and a performing module 702 configured to perform, in the event of a beam failure, a random access procedure according to the specific random access configuration.

Figure 8:
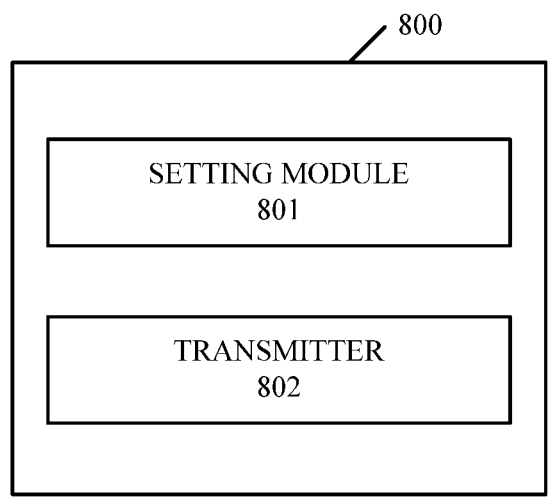
FIG. 8 is a schematic block diagram of a device for random access for beam failure recovery according to some embodiments of the present disclosure.

FIG. 8 is a schematic block diagram of a device 800 for random access for beam failure recovery according to some embodiments of the present disclosure. The device 800 may be a network device such as a base station. As shown in FIG. 8, the device 800 may comprise a setting module 801 configured to set specific random access configuration for the beam failure recovery, and a transmitter 802 configured to transmit the specific random access configuration.

It should be noted that FIGS. 7, 8 merely illustrates various functional modules in the devices 700, 800, and a person skilled in the art can implement these functional modules in practice using any suitable software and hardware. Thus, the embodiments herein are generally not limited to the shown structure of the devices 700, 800 and functional modules.

In some embodiments of the present disclosure, there is also provided a computer readable storage medium having a computer program stored thereon. The computer program is executable by a device to cause the device to carry out the above method for beam failure recovery.

In some embodiments of the present disclosure, there is also provided a computer program product executable by a device to cause the device to carry out the method for beam failure recovery according to some embodiments of the present disclosure.

In general, the various exemplary embodiments may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules comprise routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure comprises any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method in a user equipment in a network comprising:
receiving a message comprising a random access configuration for beam failure recovery from the network, wherein the random access configuration comprises at least a maximum number of preamble transmission attempts;
determining a beam failure event;
performing a random access procedure for beam failure recovery using the random access configuration, the random access procedure comprises:
selecting at least one candidate beam with a Reference Signal Received Power (RSRP) higher than a threshold; and
attempting random access via the selected at least one candidate beam with the RSRP higher than the threshold by sequencing through each selected at least one candidate beam from highest RSRP to lowest RSRP, including re-attempting the random access via one or more of the selected at least one candidate beam; and
stopping the random access procedure when:
the random access procedure is successful;
a radio link failure (RLF) timer expires; or
the maximum number of the preamble transmission attempts is reached prior to the RLF timer expiring.

2. The method according to claim 1, wherein the random access configuration further comprises one or more of the following parameters:
a size of random access response window; and
a contention free random access resource.

3. The method according to claim 1 further comprising:
generating an indication that the random access procedure is for the beam failure recovery.

4. A user equipment comprising:
a processor; and
a memory containing instructions which, when executed by said processor, cause said user equipment to:
receive a message comprising a random access configuration for beam failure recovery from a network, wherein the random access configuration comprises at least a maximum number of preamble transmission attempts;
determine a beam failure event;
perform a random access procedure for beam failure recovery using the random access configuration, the random access procedure to:
select at least one candidate beam with a Reference Signal Received Power (RSRP) higher than a threshold; and
attempt random access via the selected at least one candidate beam with the RSRP higher than the threshold by sequencing through each selected at least one candidate beam from highest RSRP to lowest RSRP, including re-attempting the random access via one or more of the selected at least one candidate beam; and
stop the random access procedure when:
the random access procedure is successful;
a radio link failure (RLF) timer expires; or
the maximum number of the preamble transmission attempts is reached prior r expiring.

5. The user equipment according to claim 4, wherein the random access configuration further comprises one or more of the following parameters:
a size of random access response window; and
a contention free random access resource.

6. The user equipment according to claim 4, wherein the user equipment is further to generate an indication that the random access procedure is for the beam failure recovery.

7. A base station comprising:
a processor; and
a memory containing instructions which, when executed by said processor, cause said base station to:
set a random access configuration for beam failure recovery, wherein the random access configuration comprises at least a maximum number of preamble transmission attempts; and
transmit a message comprising the random access configuration for beam failure recovery to a user equipment (UE), in order for the UE to determine a beam failure event, and in order for the UE to perform a random access procedure for beam failure recovery using the random access configuration, the random access procedure to:
select at least one candidate beam with a Reference Signal Received Power (RSRP) higher than a threshold; and
attempt random access via the selected at least one candidate beam with the RSRP higher than the threshold by sequencing through each selected at least one candidate beam from highest RSRP to lowest RSRP, including re-attempting the random access via one or more of the selected at least one candidate beam;
wherein the UE stops the random access procedure when:
the random access procedure is successful;
a radio link failure (RLF) timer expires; or
the maximum number of the preamble transmission attempts is reached prior to the RLF timer expiring.

8. The base station according to claim 7, wherein the random access configuration further comprises one or more of the following parameters:
a size of random access response window; and
a contention free random access resource.

9. The base station according to claim 7, wherein the base station is further to receive an indication that the random access procedure is for the beam failure recovery.

* * * * *